Sept. 9, 1924.
C. O. ORMSBEE
1,507,851
VEHICLE BODY AND UPHOLSTERING OR WALL CUSHION THEREFOR
Filed Dec. 30, 1922  2 Sheets-Sheet 1
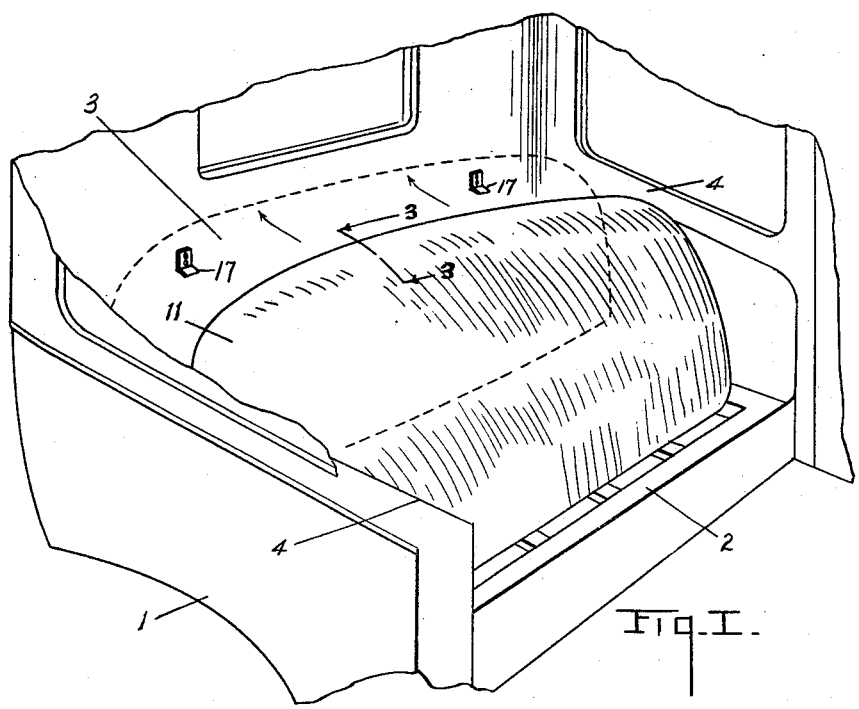
Fig. I.
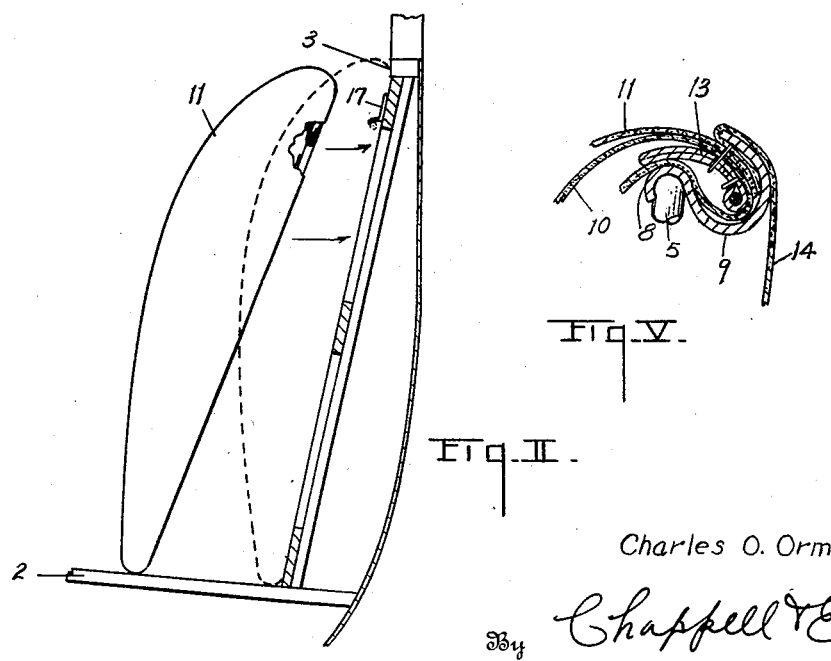
Fig. II.
Fig. V.
Inventor
Charles O. Ormsbee
By Chappell & Earl
Attorneys Sept. 9, 1924.                                           1,507,851
                        C. O. ORMSBEE
        VEHICLE BODY AND UPHOLSTERING OR WALL CUSHION THEREFOR
                      Filed Dec. 30, 1922        2 Sheets-Sheet 2
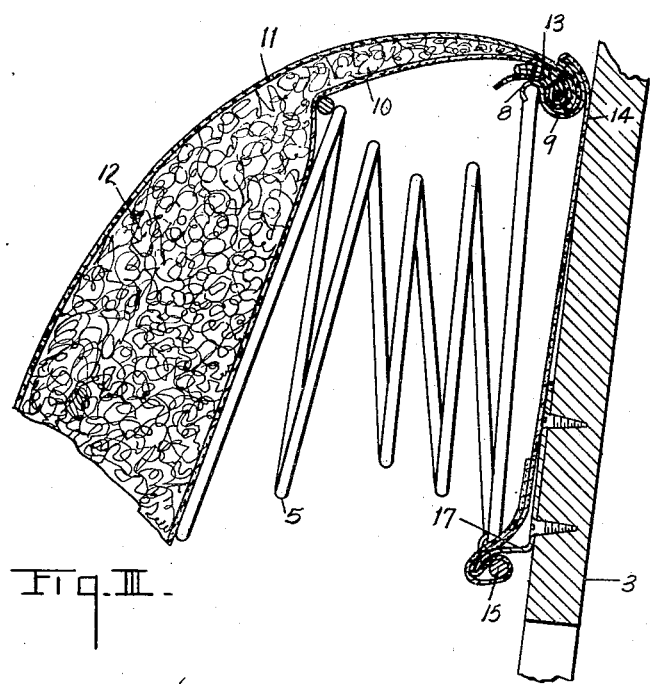
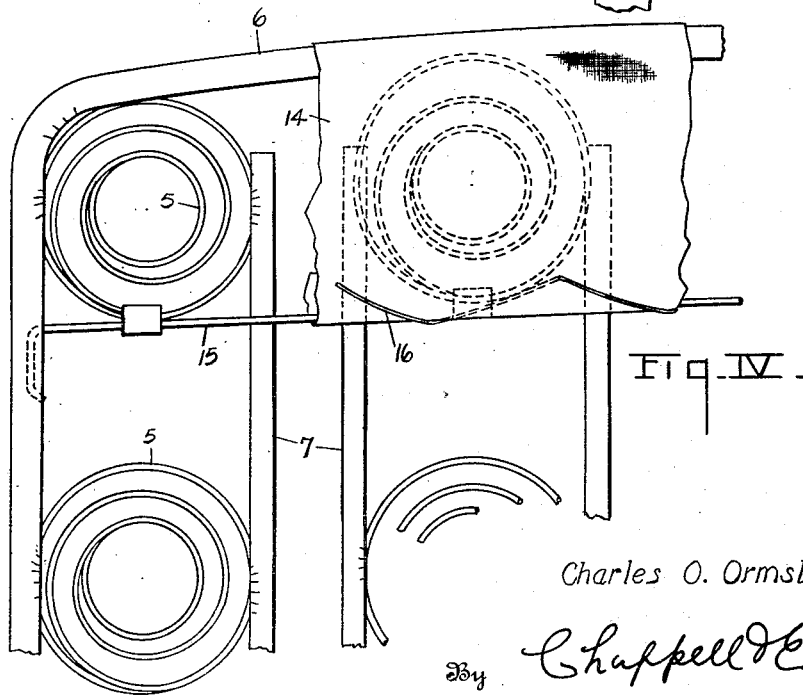
Inventor
Charles O. Ormsbee
By Chappell & Earl
Attorneys Patented Sept. 9, 1924.

1,507,851

UNITED STATES PATENT OFFICE.

CHARLES O. ORMSBEE, OF FLINT, MICHIGAN, ASSIGNOR TO L. A. YOUNG INDUSTRIES, INC., OF DETROIT, MICHIGAN.

VEHICLE BODY AND UPHOLSTERING OR WALL CUSHION THEREFOR.

Application filed December 30, 1922. Serial No. 609,908.

*To all whom it may concern:*

Be it known that I, CHARLES O. ORMSBEE, a citizen of the United States, residing at Flint, county of Genesee, State of Michigan, have invented certain new and useful Improvements in Vehicle Bodies and Upholstering or Wall Cushions Therefor, of which the following is a specification.

This invention relates to improvements in vehicle bodies and upholstering or wall cushions therefor.

The main objects of the invention are:

First, to provide an improved vehicle body and an upholstering or wall cushion such as the seat back cushions in which the upholstering is formed as complete units and quickly assembled within the vehicle body without the aid of tools, resulting in a finished and attractive job.

Second, to provide an improved wall cushion for vehicle bodies having these advantages which is simple and economical in structure.

Third, to provide an improved wall or upholstering cushion for vehicle bodies which is very strong and durable.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a detail perspective view of a portion of an automobile body, the seat cushion being omitted, the back cushion being illustrated in position by dotted lines and in process of mounting or engaging its supports within the body by full lines, the manner of engagement being indicated by the arrows.

Fig. II is a fragmentary view partially in vertical section further illustrating the manner of assembling the wall upholstering cushions within the vehicle body.

Fig. III is an enlarged detail vertical section on a line corresponding to line 3—3 of Fig. I with the cushion in its assembled position within the vehicle body.

Fig. IV is a fragmentary rear elevation of the cushion.

Fig. V is an enlarged cross section through the border rim.

In the drawing similar reference characters refer to similar parts throughout the several views and the sectional views are taken looking in the direction of the little arrows at the ends of the section lines.

Referring to the drawing, 1 represents the vehicle body and 2 the rear seat thereof, 3 being the rear wall and 4, 4 the side walls thereof. The wall upholstering cushion illustrated is the seat back and it comprises the coiled springs 5 of the double helical type which are supported on a base consisting of the border rim 6 and the cross piece 7. The border rim is preferably of S cross section, as illustrated, providing an inwardly facing channel 8 adapted to support the springs, the bottom coils of the outer or border springs in the structure illustrated being clamped within the channel, the outer channel 9 providing an upholstering securing channel. The upholstering in the structure illustrated comprises the inner lining 10 and the outer covering 11 with suitable filling 12 between. A welt 13 is secured to the edge of the outer covering by suitable stitches and is clamped thereto and to the edge of the lining within the channel 9. The upholstery covering has an extension finishing flap 14 arranged along its upper edge, as in the structure illustrated. This extension flap is preferably the same material as the covering and its edge is clamped with the covering and the welt within the upholstering securing channel. The flap is then folded rearwardly over the border frame, providing a finish for the edge of the cushion. The inner edge of the flap is folded over the cross wire 15, which is secured on the back of the cushion and secured thereto as by stitches indicated at 16, "whip stitching" being all that is ordinarily required.

On the rear wall 3 of the body are downwardly facing hook-like supporting members 17 which are adapted to be engaged with the cross wire 15, as illustrated in Fig. III, thereby supporting the cushion with its lower edge resting upon the seat, as shown in Fig. II. In engaging the cushion it is tilted rearwardly until its cross wire may be engaged under the supporting members. The bottom of the cushion is then forced rearwardly to bring the cushion against the wall with its lower edge resting on the seat, which places some stress or pressure on the rod 15, thereby providing very secure connection for the cushion to the wall.

The finishing strip or flap 14, as described, provides a very attractive finish for the edge of the cushion and no further means of attachment or finish are required.

My improved wall upholstering cushion is very economical to produce and to assemble within the vehicle body and also results in a very substantial economy in the body structure, and the assembling is a very simple item. This enables the forming of the bodies complete, baking of the enamel thereon, if desired, and the rapid assembling of the upholstery within the finished body.

I have illustrated and described my improvements in a form which I have found very practical, certain parts being shown conventionally, as the structural details form no part of this invention. I have not attempted to illustrate or describe various modifications and adaptations which I contemplate, as I believe the disclosure herein made will enable those skilled in the art to which this invention relates to embody or adapt the same as may be desired.

Having thus described my invention, what I claim as new and desire to secure by Letters Patent, is:

1. The combination of an upholstered cushion comprising springs, a border frame having an outwardly facing upholstery securing channel, an upholstery covering having an edge provided with a finishing flap, said covering and the outer edge of said flap being clamped within said channel, said flap being folded rearwardly over the border frame and constituting a finish for the edge of the cushion, and a cross wire mounted on the back of the cushion in spaced relation to said border frame, the inner edge of said flap being secured to said cross wire.

2. The combination of an upholstered cushion comprising springs, a border frame having an outwardly facing upholstery securing channel, and an upholstery covering having an edge provided with a finishing flap, said covering and the outer edge of said flap being clamped within said channel, said flap being folded rearwardly over the border frame and constituting a finish for the edge of the cushion.

3. The combination of an upholstered cushion comprising springs, a border frame having an outwardly facing upholstery securing channel, an upholstery covering having an edge provided with a finishing flap, the edge of said covering and the outer edge of said flap being clamped within said channel, the flap being rolled rearwardly over the border frame and constituting a finish for the edge of the cushion, and a means for securing the inner edge of said flap disposed on the back of the cushion.

In witness whereof, I have hereunto set my hand and seal.

CHARLES O. ORMSBEE. [L. S.]